J. L. HOLMES.
GROUND TILLING MACHINE.
APPLICATION FILED SEPT. 12, 1912.
1,052,146.
Patented Feb. 4, 1913.
SHEETS—SHEET 1.
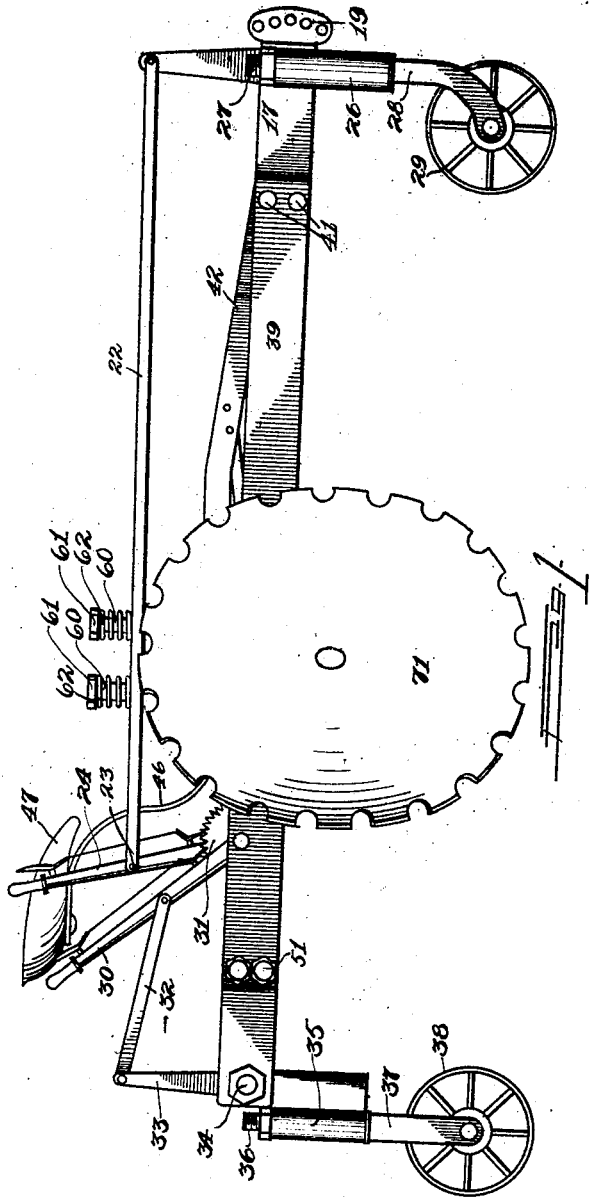
Witnesses
Inventor
Jesse L. Holmes
By Shepherd & Campbell
Attorneys

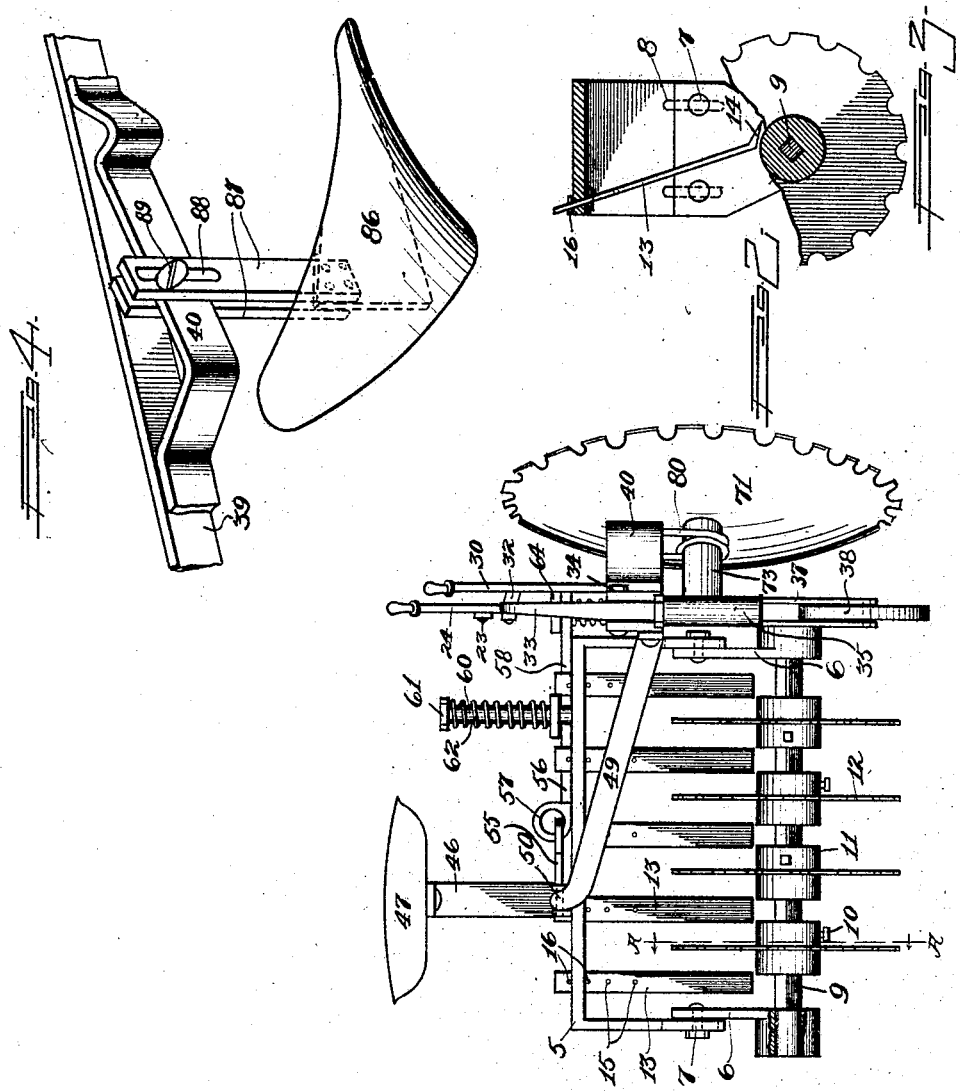

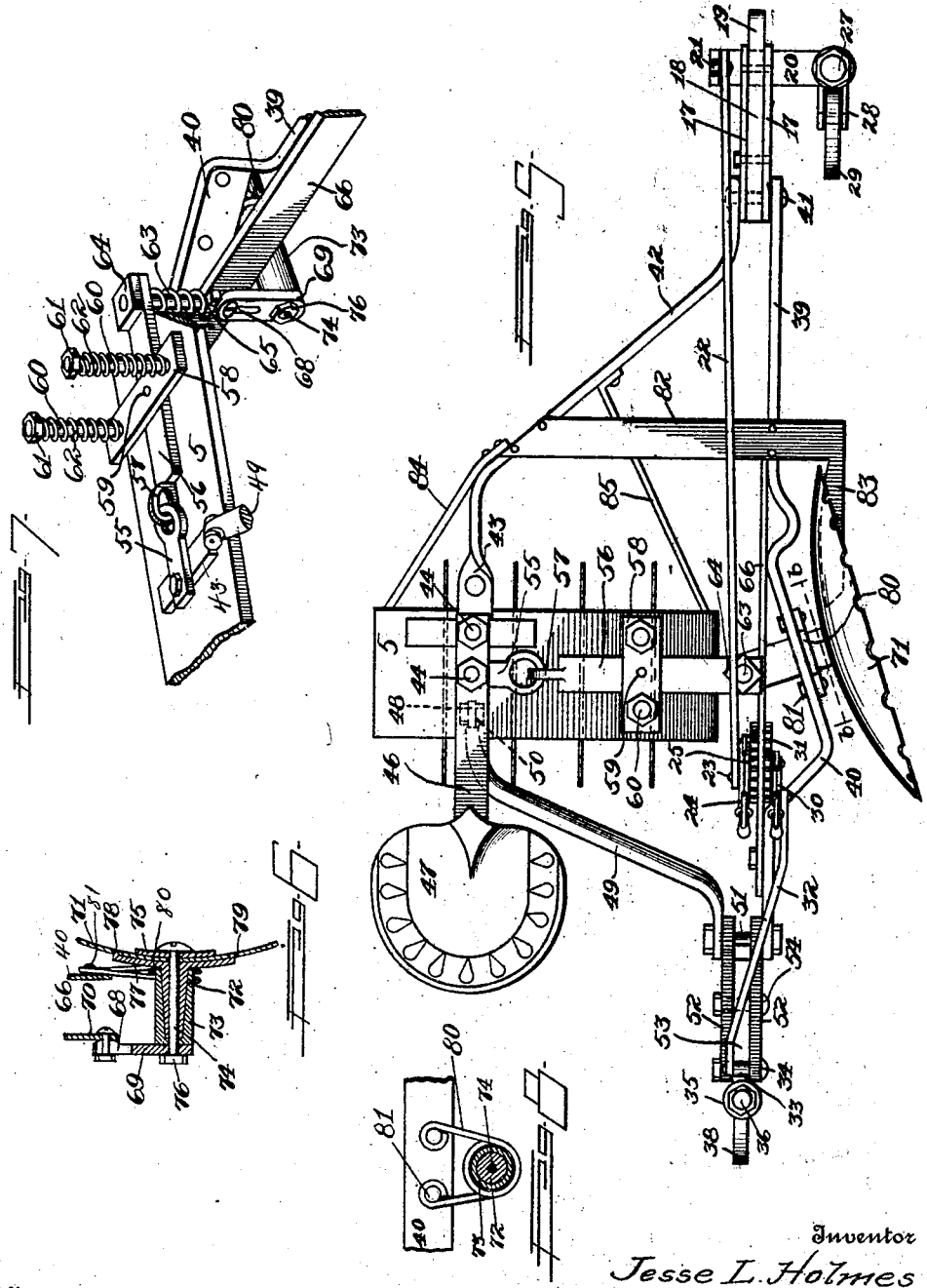

UNITED STATES PATENT OFFICE.

JESSE L. HOLMES, OF JUNO, TENNESSEE.

GROUND-TILLING MACHINE.

1,052,146.  Specification of Letters Patent.  Patented Feb. 4, 1913.

Application filed September 12, 1912. Serial No. 719,987.

*To all whom it may concern:*

Be it known that I, JESSE L. HOLMES, a citizen of the United States of America, residing at Juno, in the county of Henderson and State of Tennessee, have invented certain new and useful Improvements in Ground-Tilling Machines, of which the following is a specification.

This invention relates to a ground tilling machine, and more particularly to a device adapted to plow and thoroughly pulverize the ground at a single operation.

To accomplish this the machine comprises a plurality of cutting elements, said cutting elements first slicing the ground or sod into a plurality of longitudinal strips in such manner that when the plow turns these strips over they are thoroughly broken up and pulverized and ready for seeding without any further operation.

The slicing disks in this invention are utilized to partially support the weight of the machine, and the driver, and to that end they perform a double function, and since they cut into the ground they resist any side draft to such an extent that the extra draft brought upon the team by the simultaneous action of the disks and the plow is largely compensated for.

Further objects and advantages of the invention will be set forth in the detailed description which now follows.

In the accompanying drawing Figure 1 is a side elevation of a machine constructed in accordance with the invention. Fig. 2 is a rear elevation thereof. Fig. 3 is a detailed sectional view upon line A—A of Fig. 2. Fig. 4 is a detailed view illustrating an ordinary mold board plow substituted for the disk plow shown in the other figures. Fig. 5 is a plan view of the machine. Fig. 6 is a detailed sectional view illustrating the method of mounting the disk plow. Fig. 7 is a detailed perspective view of a spring mounting for the plow supporting beam, and Fig. 8 is a sectional view upon line b—b of Fig. 5.

Like numerals designate corresponding parts in all of the figures of the drawing.

Referring to the drawings, it will be seen that the frame of the machine comprises an inverted U-shaped member 5. Supported from the down turned legs of this member are hangers or bearing brackets 6, said brackets being capable of vertical adjustment by reason of the fact that they are secured in position by bolts 7 which pass through slots 8 in the down turned legs of member 5. Supported in the hangers 6 and rotating therein, is a shaft 9. The outer ends of this shaft are reduced and rounded, while the intermediate portion of the shaft is angular in cross section. Slidably mounted upon the shaft, and capable of being secured in any position longitudinally thereof by set screws 10 or other adjusting devices, are the hubs 11 of disks 12. These disks may be serrated or plane, so long as they are adapted to cut the ground or sod into longitudinal strips or slices. To prevent the earth from packing between the disks, I have provided bars 13, preferably having chisel like ends 14. These bars have a plurality of openings 15 therethrough for the reception of cotter pins or like fastening devices 16, said pins serving to adjust the bars vertically. The exact size and shape of these bars is immaterial so long as they are capable of performing the function of preventing the dirt from packing and remaining between the disks 12. Bolted between a pair of bars 17 is a clevis bar 18, having at its forward end a clevis 19, to which draft animals may be hitched. Passing through and mounted to turn in bars 17, and clevis bar 18, is a transverse shaft 20 having at one end an upstanding crank arm 21. Movement may be imparted to this crank arm by a link 22, the rear end of which is pivotally connected at 23 to a lever 24, which is capable of adjustment over a rack 25 in the usual and well known manner. Carried by one end of the shaft 20 is a bearing sleeve 26 in which is journaled for rotation, a shank 27 of forks 28. A wheel 29 is mounted to turn in these forks and it is apparent that adjustment of lever 24 will turn shaft 20 and swing sleeve 26 and forks 28 in such manner as to bodily raise or lower the frame of the machine, and consequently to bring the plow into or out of action. In like manner a lever 30 capable of adjustment over a rack 31 is connected by means of a link 32 to an upstanding crank arm 33, said crank arm being extended below its pivot point 34 and provided with a sleeve 35 in which the shank 36 of forks 37 is journaled. A ground wheel 38 is mounted to turn in these forks and serves the same purpose at the rear end of the machine that the wheel 29 serves at the forward end of the machine.

The frame of the machine prises a longitudinally extending beam 39 having the offset angularly disposed bar 40 intermediate its ends. Bolts 41 pass through the forward end of the beam and through bars 17 and clevis bar 18. One of these bolts also passes through and pivotally mounts a frame member 42 which is twisted at right angles at 43 and is secured to the upper face of the U-shaped frame member 5 by bolts 44. These bolts also serve to secure in position a seat spring bar 46 which carries the driver's seat 47. The rear end of the frame member 42 is bifurcated for the reception of the end 48 of a frame member 49, said frame member being pivoted upon a pin 50. Passing through the rear ends of the frame members 39 and 49 is a bolt 51. This bolt passes through bars 52, said bars being spaced apart by a spacing block 53 which is maintained in position by a bolt 54, and it is between the bars 52 that crank arm 35 is pivoted, as hereinbefore set forth. One of the bolts 14 also secures in position an eye 55, with which a bar 56 has hinged engagement through the medium of an eye 57. Bar 56 has secured thereto, a bar 58 by means of a rivet or other fastening indicated at 59 (see Fig. 7). Upstanding posts 60 carried by the frame member 5 pass through the bar 58 and have nuts 61 threaded upon their upper ends. Springs 62 bear between these nuts and the bar 58 and normally tend to resist upward movement of said bar. Through the outer end of the bar 56 passes a post 63 and upon the upper end of this post is threaded a nut or other head member 64. The lower end of this post is secured at 65 to a bar 66 that is secured to and moves with beam 39. It will therefore be seen that the beam 39 which as hereinafter set forth, carries the disk plow, is capable of a vertical movement with relation to the frame member 5, said movement being resisted by the action of the springs, whereby the disks 12 are not forced out of the ground when the plow rides over an obstruction, and in like manner the plow is not forced out of the ground when the disks ride over an obstruction. The bar 66 (see Figs. 5 and 7) has secured thereto by a bolt and slot connection 68 a depending hanger bar 69, and the inner face of this hanger bar is rounded at 70 to permit the necessary movement of said hanger with relation to bar 66 when the hanger bar is swung forward or rearwardly to change the angle of the plow. The plow employed and supported by beam 39 may be either a disk plow or a mold board plow, and both forms have been illustrated. When a disk plow is employed, the disk which may be either serrated or plain, and which is indicated at 71 is supported from a hub which comprises (see Fig. 6) a tapered inner sleeve 72 which enters a tapered outer sleeve 73.

A bolt 74 passes through a washer 75, through the disk and through said sleeves, and is secured to the hanger bar 69 by a nut 76. The inner sleeve 72 carries a flange 77 having fingers 78 which enter openings 79 formed in the disk to cause the disk to turn with the inner sleeve. The inner end of the outer sleeve is, therefore, supported from the hanger bar 69, but the outer portion thereof is supported by a yielding loop member 80, the bight of which is given a single turn about the sleeve 73 and the terminal ends of which are secured by bolts 81 to the angular offset portion of beam 39. A scraper 82 extends across the frame, and its terminal end 83 lies in position to prevent the dirt from banking up in the disk plow. The frame is further strengthened by braces 84 and 85.

In Fig. 4 an ordinary mold board plow 86 has been indicated merely to show that a plow of this type may be utilized in place of the disk plow. This mold board plow is secured to the lower ends of a standard comprising spaced bars 87 having slotted upper ends 88 through which a bolt 89 passes to secure said plow to the offset portion 40 of beam 39, as will be readily understood. This permits the adjustment of the plow to any desired angle.

While I have shown rotative disks 12, it is to be understood that the invention is not limited to having these disks rotate. They might be fixed knives like the runners of a sled, and they would operate in that case to slice the sod or earth in the same manner that the disks slice it. Since the plow does not cut as wide a furrow as the path traversed by the disks 12, it follows that these disks, during their successive passages, overlap their track and consequently the earth is cut into narrow strips and when turned out by the plow readily falls apart and leaves the ground sufficiently pulverized for immediate seeding without the use of a harrow or roller. The invention further is not limited to the number of disks 12 which may be employed, or to the manner of mounting these disks. Any desired number of disks may be used and these disks may be set closer together or farther apart than is shown in the drawing, and they may be secured in various ways to the shaft.

While the elements shown and described are well adapted to serve the purposes for which they are intended, it is to be understood that the invention is not limited to the precise construction set forth, but includes within its purview, such changes as may be made within the scope of the appended claims.

Having described my invention what I claim is:

1. In a device of the character described, the combination with a supporting frame, of a plurality of sod slicing members carried thereby, said sod slicing members traveling in contact with the ground and supporting said frame, a plow supporting frame yieldingly mounted with relation to the first named frame, and a plow carried by the plow supporting frame and so disposed as to throw the dirt away from said slicing members.

2. In a device of the character described, the combination with a disk supporting shaft, of a frame member in which said shaft is mounted, a plurality of disks upon said shaft, a two part hingedly connected frame member connected to the disk supporting frame member, bars to which the opposite ends of said last named frame member are connected, a plow supporting beam extending between said bars, said beam having an offset angularly disposed portion and a disk plow supported at an angle to the line of travel of the machine from said offset portion.

3. In a device of the character described, the combination with a disk supporting shaft, of a frame member in which said shaft is mounted, a plurality of disks upon said shaft, a two part hingedly connected frame member connected to the disk supporting frame member, bars to which the opposite ends of said last named frame member are connected, a plow supporting beam extending between said bars, said beam having an offset angularly disposed portion, a disk plow supported at an angle to the line of travel of the machine from said offset portion, and ground wheels pivotally mounted with relation to said two part frame member.

4. In a device of the character described, the combination with a disk supporting shaft, of a frame member in which said shaft is mounted, a plurality of disks upon said shaft, a two part hingedly connected frame member connected to the disk supporting frame member, bars to which the opposite ends of said last named frame members are connected, a plow supported beam extending between said bars, said beam having an offset angularly disposed portion, a disk plow supported at an angle to the line of travel of the machine from said offset portion, ground wheels pivotally mounted with relation to said two part frame member, and means for bodily raising and lowering the frame with relation to said ground wheels.

5. In a device of the character described, the combination with a disk supporting shaft, of a frame member in which said shaft is mounted, a plurality of disks upon said shaft, a two part hingedly connected frame member connected to the disk supporting frame member, bars to which the opposite ends of said last named frame member are connected, a plow supporting beam extending between said bars, said beam having an offset angularly disposed portion, a disk plow supported at an angle to the line of travel of the machine from said offset portion and means for yieldingly connecting the plow supporting beam with the first named frame member.

6. In a device of the character described, the combination with a disk supporting shaft, of a frame member in which said shaft is mounted, a plurality of disks upon said shaft, a two part hingedly connected frame member connected to the disk supporting frame member, bars to which the opposite ends of said last named frame member are connected, a plow supporting beam extending between said bars, said beam having an offset angularly disposed portion, a disk plow supported at an angle to the line of travel of the machine from said offset portion, means for yieldingly connecting the plow supporting beam with the first named frame member, said means comprising a bar connected to a portion of the first named frame member, springs resisting the movement of said bar in both directions, and a member passing through said bar and secured to said beam.

In testimony whereof I affix my signature in presence of two witnesses.

JESSE L. HOLMES.

Witnesses:
W. W. GARDNER,
T. B. AUTRY.